United States Patent [19]
Cann

[11] Patent Number: 5,946,759
[45] Date of Patent: Sep. 7, 1999

[54] BRUSH HEAD

[75] Inventor: David Victor Cann, Stonehill, United Kingdom

[73] Assignee: The Procter & Gamble Company, Cincinnati, Ohio

[21] Appl. No.: 09/101,917

[22] PCT Filed: Jan. 17, 1997

[86] PCT No.: PCT/US97/00969

§ 371 Date: Aug. 20, 1998

§ 102(e) Date: Aug. 20, 1998

[87] PCT Pub. No.: WO97/25900

PCT Pub. Date: Jul. 24, 1997

[30] Foreign Application Priority Data

Jan. 18, 1996 [GB] United Kingdom ................... 9601013

[51] Int. Cl.[6] .................................................. A46B 9/04
[52] U.S. Cl. .............................. 15/167.1; 15/172; 15/201
[58] Field of Search .................................. 15/167.1, 172, 15/201

[56] References Cited

U.S. PATENT DOCUMENTS

| 2,254,365 | 9/1941 | Griffith et al. |
|---|---|---|
| 3,188,672 | 6/1965 | Gary. |
| 5,465,450 | 11/1995 | Humphries. |
| 5,651,158 | 7/1997 | Halm. |

*Primary Examiner*—Randall E. Chin
*Attorney, Agent, or Firm*—William Scott Andes; Vanessa M. Nichols

[57] ABSTRACT

The present invention relates to resiliently flexible brush heads, more particularly to toothbrush heads, having segmented faces with grooves between the segments, wherein the grooves on at least one face contain elastomer, so that the head durability is improved through repeated flexing. The invention further relates to toothbrushes comprising the brush heads.

10 Claims, 2 Drawing Sheets

BRUSH HEAD

FIELD OF THE INVENTION

The present invention relates to resiliently flexible brush heads, more particularly to toothbrush heads, having segmented faces with grooves between the segments, wherein the grooves on at least one face contain elastomer, so that the head durability is improved through repeated flexing. The invention further relates to toothbrushes comprising the brush heads.

BACKGROUND OF THE INVENTION

The configuration of human teeth requires that the ideal bristle contour for toothbrushes for brushing the buccal or outside surfaces of teeth be concave and that the ideal bristle contour for brushing the lingual or inside surfaces of teeth be convex. Most brushes have a single piece head which is of comparable thickness to the handle and which is relatively rigid and of a fixed curvature or configuration.

A further drawback of conventional brushes is that pressing the brush sufficiently hard against the teeth to get good cleaning risks damaging or discomforting the softer, adjacent gums. To a certain extent this can be solved by modifying the configuration of the brush, or by varying bristle hardness or length, though again, a single configuration cannot be optimum for all circumstances.

Some brushes may, however, incorporate a means for allowing the head to flex relative to the handle, as described for example in EP-A-371,293. Even so, such brushes have limited effectiveness. Other brushes are known which are adjustable into several different but fixed configurations. Adjustable toothbrushes are often difficult to manipulate and may be unreliable.

U.S. Pat. No. 4,712,267 discloses a convertible toothbrush comprising an S-shaped elongated handle of shape-retaining material having curved end regions of opposite curvature, a flexible brush block containing bristles, and a means for mounting the flexible brush block on the handle for longitudinal movement along the length of the handle. The curved portions of the handle bend the flexible block and bristles into a concave or convex configuration which corresponds to the curved configuration of the handle.

EP-A-454,625 describes an adjustable curvature toothbrush whose head is in the form of a loop. A cam or slide mechanism changes the curvature of the head between concave and convex configurations. In an alternative embodiment, the head is an integral part of the handle which is in the form of a compressible closed loop, the bristle surface being in a concave configuration when the handle is in its uncompressed state, becoming convex when the handle is compressed.

The brushes of the two aforementioned documents require the user to set the brush head to one configuration or another. The brush head remains in that configuration until reset. U.S. Pat. No. 2,445,657 on the other hand describes a toothbrush with a single material resilient head, e.g. of vulcanised rubber, jointed to a handle. The head is continuously flexible and its curvature can be adjusted by pressing against the teeth, gums or cheek. It is more difficult however, with such a brush head, to manufacture the brush to the required flexibility and the softer head material required presents additional problems of affixing the bristles, relative to conventional brush head materials.

WO 92/17093 discloses a toothbrush having a handle and at one end thereof a bristle-bearing head, wherein the head is in the form of two or more segments flexibly and resiliently linked to each other and/or to the handle, one or more of the segments being bristle bearing. In one embodiment this is achieved by the use of transverse, and optionally longitudinal, grooves on the opposite face of the head to the bristles. The grooves can be wholly or partially filled with an elastomer. In another embodiment the handle extends into a frame into whose interior the head is resiliently linked and voids between the head and the frame may be filled with an elastomer. In all embodiments the bristles are inserted into conventional brush head materials e.g. polyamides and polypropylenes.

While the above toothbrushes provide brush heads with some degree of flexibility, none of them is entirely satisfactory. In particular, they require undue manipulation or skill on behalf of the user, a more complex assembly process or fail to teach how to assure long-term durability of the brush head through repeated flexing.

Where it is desired to manufacture the brush head from the primarily conventional materials used to hold bristles then, preferably, points of weakness e.g. grooves must be built into the head to permit the desired head flexibility. Through many cycles of repeated flexing, the brush head material can be prone to failure, i.e. breaking at the thinned, grooved parts of the head. Alternatively, where the grooves are filled with elastomer to control flexibility or for hygiene reasons, the bond between the elastomer and the head material can be prone to failure.

It has now been found that the durability of the brush head can be improved by ensuring that the brush head has grooves on each faces of the head with elastomer contained in the grooves of at least one face, with the head flexibility being limited to a flex angle of less than about 40°.

The durability of the brush head can further be improved by providing that hinges of the head material, which connect the segments of the head are located between opposing faces of the brush head and at a distance of at least about 10% of the depth of the head from each of the faces.

It is accordingly an object of this invention to provide a brush head which can flex resiliently and which has good long-term durability.

It is a further object of this invention to provide a toothbrush comprising such a brush head.

SUMMARY OF THE INVENTION

According to one aspect of the present invention there is provided a resiliently flexible brush head having a pair of opposing faces, one of the pair being a bristle-bearing face with bristles attached to and extending from the face, the head comprising two or more flexibly connected segments and having grooves on each of the opposing faces between the segments, the grooves on at least one face containing elastomer, wherein the head has a flex angle of less than about 40°.

According to a second aspect of the invention there is provided a brush head wherein the grooves are transverse grooves arranged in pairs such that one member of each pair is on each face and directly opposes the other member of the pair, with one or more hinges therebetween connecting the segments so that each hinge is located between the two faces and at a distance of at least about 10% of the depth of the head from each of the faces.

According to a further aspect of the invention there is provided toothbrushes comprising such heads.

The brush head of this invention comprises two or more flexibly connected segments, with grooves between the segments, to allow the head to flex under the action of brushing and accommodate itself to, for example, the differing profiles of individual users' teeth. The head further includes elastomer contained within the grooves on at least one face. The elastomer can improve the resilience of the head by acting like a spring, so that when a force applied to bend the head is removed, the head returns within a short period of time to its original configuration. The grooves define hinges between the segments. The hinges are preferably located between the faces, preferably at a distance of at least about 10% of the depth of the head from each of the faces, rather than being co-extensive with either of the faces. The elastomer can also act to limit the degree of bending so that when high levels of force are applied the head flex is limited, largely reducing the incidence of excess strain on the hinges and thereby improving the durable of the product.

DETAILED DESCRIPTION OF THE INVENTION

The resiliently flexible head of this invention comprises a pair of opposing faces with bristles mounted on one of said pair, the head comprising two or more flexibly connected segments and having grooves on each of the opposing faces, between the segments, to allow the head to flex or bend. The brush head is designed to be attached to an elongated handle at one end thereof, such as in a conventional toothbrush. The head can be detachably connected to the handle, for example to permit replacement of the head when the bristles become worn, in which case the head has a point of attachment for the handle. In a preferred embodiment the segments of the head are co-moulded with the handle in a single injection moulding step, so that the head and handle form one continuous piece. In any case the long axis of the handle defines a longitudinal axis of the head. The head also has a transverse axis lying orthogonal to the longitudinal axis and generally parallel to the opposed faces. References to transverse or longitudinal herein refer to directions which are respectively parallel to these transverse and longitudinal axes, unless indicated otherwise. The head itself is also generally elongated, with its elongated axis also being a longitudinal axis.

The head and handle are generally made of relatively non-compressible materials, preferably with a modulus of elasticity of at least about 500 MPa, more preferably at least about 1000 MPa, which are conventional in the manufacture of toothbrushes, especially plastics materials. Suitable plastics materials include, for example, polyamides and polypropylenes. Polypropylene is preferred. Suitable polypropylenes include the material 'Polypropylene PM 1600' (marketed by Shell), having a modulus of elasticity (ISO 178) of 1500 MPa and Apryl 3400 MA1 from Elf Atochem. Preferably, a foaming agent such as Hydrocerol HP20DP from Boehringer-Mannheim is mixed with the polypropylene at a level of from about 1% to about 3%, preferably from about 1.5% to about 2.5%, by weight of the polypropylene. The foaming agent assists the flow of the polypropylene during moulding and, in particular, helps to ensure uniform formation of the hinges. The handle itself is generally rigid and may be of a shape which is conventional in the manufacture of toothbrushes. Optionally, the handle may comprise a neck portion which is more flexible than the rest of the handle, as known in the art, provided that it is sufficiently rigid that, in use, when force is applied to the head, particularly when brushing the teeth, the head still flexes in the manner and to the extent described below.

The brush head includes grooves on the bristle-bearing face and the opposing face, the grooves being the spaces between the segments. The grooves allow the head to flex or bend. The grooves can be oriented transverse or parallel to the longitudinal axis of the handle and can be linear or non-linear, such as curved or zigzag. Non-linear grooves help to offset compression stress in the elastomeric material filling the grooves as the head bends. The term 'transverse grooves' as used herein can also encompass grooves whose main axis, as defined by the straight line joining the start and endpoints of the grooves is offset from the transverse axis of the head by an angle of up to and including 45°. Similarly, the term 'longitudinal grooves' can also encompass grooves whose main axis, is offset from the longitudinal axis of the head by an angle of up to 45°.

In preferred embodiments the brush head comprises one or more transverse grooves on each of the opposed faces so that the head can bend along the longitudinal axis. This allows the brush head to flex so that it acquires a convex profile along the longitudinal axis when pressed against the teeth. This makes it particularly suitable for brushing the lingual or inside surfaces of the teeth.

The brush head can also comprise one or more longitudinal grooves. Longitudinal grooves can allow, for example, the outer longitudinal rows of bristles to flex away from the inner ones.

In especially preferred embodiments the brush head comprises both transverse grooves on each of the opposed faces so that the head can bend along the longitudinal axis and at least one longitudinal groove which connects the transverse grooves to permit the elastomer to flow from one groove to the other during the moulding process. In a single-piece brush with a co-moulded handle, this longitudinal groove can extend along the handle so that the same elastomer injection point in the mould that is customarily used for supplying elastomer to form handle grips can also be used to inject the elastomer for the grooves of the head.

Grooves on one of the two opposing faces can be directly opposed to grooves on the other face or partially or wholly offset. Preferably, the grooves are directly opposed or only partially offset.

The grooves, which separate the segments of the head, also define hinges, which are thinned regions of the head at the base of the grooves.

The grooves can be of variable width and depth and the distances between grooves can also be varied. In this manner the flexibility of the head along the length and/or across the breadth of the head can be modified. Preferably only transverse grooves are varied in this way. Changing the depth of the grooves controls the location and thickness of the hinges which connect the segments. For a toothbrush head of between about 4 to about 6 mm thickness, typically about 5 mm, suitable groove depths are in the range from about 1.4 to about 3 mm, preferably from about 1.5 to about 2.8 mm. Suitable hinge thicknesses are in the range from about 0.4 to about 2.0 mm, preferably from about 0.5 to about 1.5 mm. Where transverse grooves are used then, desirably, the hinges which are or will be nearer to the handle are less flexible than those which are or will be more remote from it. In this way more uniform bending of the head can be achieved. The variation in flexibility can be achieved by varying the hinge thicknesses. In a preferred embodiment the hinge nearest the handle is up to about 3 times, preferably up to about 2 times as thick as the hinge most remote from the handle. An exemplary set of hinge thicknesses for a toothbrush with 3 transverse grooves are respectively about 1.2, 0.6 and 0.6 mm reading from the handle end. If identical hinges are used along the brush head then there is a tendency for flexing of the head to occur predominantly at the hinge nearest the handle. The depth of grooves on the bristle bearing face can be different to those on the opposing face. Preferably the grooves on the bristle-bearing face are less deep than those on the opposing face. In embodiments where there is elastomer in the grooves on both faces, this allows more elastomer to be put under compression than under tension. The elastomer to segment bonds are stronger under compression than under tension.

Increasing the width of the grooves increase the gap between the segments and therefore the length of the hinges, which increases their flexibility. However, since it is preferred to insert bristles into the segments rather than into the elastomer, increased groove length also leaves less space for the bristles, within a given head size. Suitable groove widths are in the range from about 0.3 to about 3.0 mm, preferably from about 1.2 to about 2.0 mm. The grooves are preferably tapered slightly inwards towards the bottom of the groove, suitably converging at an angle of from about 3 to about 10°, to facilitate moulding. As the brush is flexed the width of the groove changes, more rapidly at the top of the groove than at the bottom of the groove, the relative change being a function of the groove width and depth. Since this change in groove width results in compression or tension of elastomer contained within the groove, it can be seen that, for a given elastomer, the groove geometry can be used to control the flex angle.

The hinges can be the full length of the grooves or, preferably, there can be one or more gaps in or to the side of the hinges the grooves in these regions being the full depth of the head. This has the advantage of permitting a single injection point for the elastomer when moulding the head. The gap allows elastomer to flow from one face to the other during the moulding process. In a preferred embodiment, the hinges are discontinuous, with two or more hinges, preferably just two, connecting each segment to its neighbour or to the handle. In this embodiment there are gaps between the hinges and to each side. In linear grooves, the hinge widths are not generally critical, provided that they are such that gaps are still created, however, wide hinges can be subject to distortion if they are used within a non-linear groove. Suitable hinge widths are in the range from about 0.5 to about 4.0 mm, preferably from about 1.0 to about 3.0 mm.

It is preferred that each hinge is located between the two faces and at a distance of at least about 10%, preferably at least about 20%, more preferably at least about 30% of the depth of the head from each of the faces. The distance of the hinge from the face is measured by the perpendicular line drawn from the top of the face to the nearest boundary surface of the centre of the hinge. Locating the hinges away from the faces of the brush means that they are subject to less stretching or compression as the head is flexed and improves their durability. In a particularly preferred embodiment, the brush head has transverse grooves which are arranged in pairs such that one member of each pair is on each face and directly opposes the other member of the pair, with one or more hinges therebetween connecting the segments so that each hinge is located between the two faces and at a distance of at least about 10%, preferably at least about 20%, more preferably at least about 30% of the depth of the head from each of the faces.

The grooves on at least one face of the brush contain elastomer. This can be achieved by a separate injection moulding step after the moulding of the segments of the head has been completed. Preferably, all of the elastomer is injected from a single injection point. However, there can be separate elastomer injection points in the mould to supply the elastomer for discrete elastomer elements in the head, for example one to supply elastomer to the bristle-bearing face and a further injection point to supply elastomer to the opposing face. The term 'elastomer' herein refers to a material which is both elastically compressible and elastically extensible. Thus when the head is flexed in a direction orthogonal to the opposed faces, the elastomer is put either under tension or under compression. The elastomer has the effect of limiting the head flexibility thereby reducing the stretching or compression of the hinges and of limiting the stress at the bond between the elastomer and the head segments. A more durable head is thus obtained. Preferably, grooves on both the bristle-bearing face and the opposing face contain elastomer so that elastomer is put under compression whichever direction is chosen. The elastomer on the opposed face is of course put under tension but the tensile stress on the elastomer to segment bonds is limited and is shared with the hinge material.

Preferably all of the grooves are wholly filled with the elastomer, generally by a separate moulding process after the moulding of the head segments has been completed. Complete filling of the grooves has an advantage of, for example, avoiding contamination of the grooves by toothpaste deposits. The grooves can be partially filled though, provided that sufficient elastomer is used to give effective moderation of the flexibility of the head.

Suitable elastomers for use herein include thermoplastic elastomers with a Shore hardness of 30–80 and a modulus of elasticity of less than about 500 MPa, preferably less than about 300 MPa, such as Santoprene and Thermoflex. An exemplary elastomer is 'PTS Thermoflex 75' (marketed by Plastic Technologie Service, Germany), having a modulus of elasticity (ISO 178) of 100 MPa and a hardness (ISO 868) of 80 Shore A. Elastomers PL12291, PL12292, and PL12293 (marketed by Multibase, Saint Laurent Du Pont, France) are also suitable for use herein. In general, choosing the elastomer so that is based upon the same chemical class of polymers as material of the head segments assists in bonding the elastomer to the head segments. For example, when the head segments are made from polypropylene, the elastomer is perferably based upon polypropylene. The elastomers can optionally be mixed with a suitable plasticiser or foaming agent to make them more compressible. The colour of the elastomer material can be the same as that of the head segments, or it may be different thereby achieving a distinctive striped or otherwise patterned appearance.

The whole head has a conventional, generally flattened shape but remains flexible when compared to that of a conventional brush. By 'flexible' is meant herein that when a 3 Newton force is applied to one end of the head, the other end being held fixed, the end to which the force is applied will deflect through an angle of at least 2°. The end of the head which is to be held fixed is defined by the line which is perpendicular to the axis along which bending takes place and which touches the first row of bristles. In the preferred embodiments having transverse grooves, where the head bends along the longitudinal axis, the end should be that which connects to the handle. The end of the head where the force is to be applied is the opposite end of the head at the furthest point away along the bending axis. By 'resiliently flexible' is meant that when the 3 Newton force is removed, the head will return to its original position without the application of external force. The angle through which the head bends when a 3 Newton force is applied as above is referred to herein as the flex angle. The flex angle can conveniently be measured by measuring the vertical displacement (y) of the free end of the head under a 3 Newton force and the distance y and the distance between the clamping point and the application of the force (x), the flex angle being derived by the relationship tan(flex angle)=y/x. In preferred embodiments the flex angle is at least 3°, more preferably at least 5° and it can be as high as 15° or more. The construction of the head, in particular the dimensions of the grooves and hinges, the extent of elastomer filing of the grooves and hardness of the elastomer is, however, such that the flex angle is limited to less than about 40°, preferably less than 30°, more preferably less than 20°. This has been found to give an acceptable degree of flexibility for users without exposing the hinges and elastomer-segment bonds to undue stress.

In highly preferred embodiments, only one of the opposed faces is bristle-bearing and when the head is in its normal unstressed state, the free ends of bristles lying along a longitudinal axis of the brush form a generally concave profile. In highly preferred embodiments, the bristle-bearing face is concavely shaped. In these embodiments the head preferably has a flex angle such that the bristle-bearing face of the head is able to bend to the extent that the free ends of bristles lying along a longitudinal axis of the brush form a generally convex profile. The face of the head can be concave along either or both of the orthogonal axes of the head lying within the general plane of the bristle-bearing face. Where the face is concave along the longitudinal axis, the radius of curvature may vary along the length of the head. The radius of curvature is preferably from 10 to 500 mm, more preferably from 15 to 250 mm, especially from 25 to 150 mm.

The brush head has bristles extending from one of the pair of opposing faces. The bristles can be made of any of the materials well known in the art. Suitable bristle materials herein are polyester and nylon, such as Dupont Nylon 612. The bristles are preferably of circular cross-section but can also be of other cross-sections including, but not limited to, rectangular, hexagonal and trilocular. Furthermore, the diameter and length of the bristles can vary within the usual dimensions known by a person skilled in the art. The bristles are generally conventionally grouped into tufts and can be attached to the brush head by a variety of processes. Preferred processes herein are stapling and fusion. The bristles can be inserted into the segments or the elastomer, preferably into the harder material of the segments. Cutting and end-rounding of the bristles can be done using any of the methods commonly known in the art.

In use, toothbrushes comprising the brush head of this invention can be used for cleaning the teeth by an entirely conventional tooth brushing hand action, preferably in a manner recommended by dental health authorities. The brush head of the invention can also be used in electrically driven toothbrushes or children's toothbrushes.

The invention will now be described by way of example only, with reference to the accompanying drawings in which.

Figure 1:
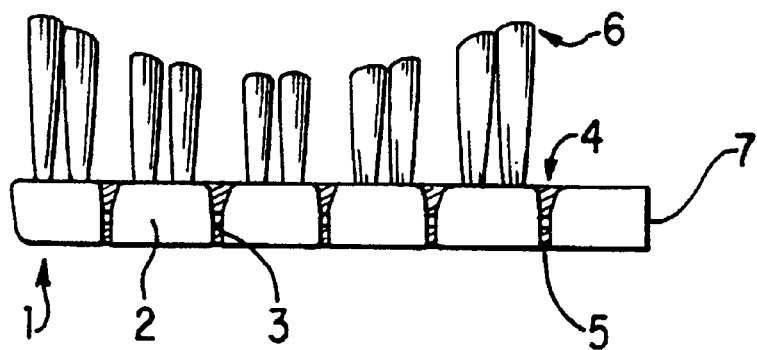
FIG. 1 is a partial side view of a first embodiment of the invention, depicting a brush head with transverse grooves. Although the head is flat in its unstressed state, the bristles are cut to different lengths so that the bristle surface is concave along the longitudinal direction.

Referring to FIG. 1, a brush head (1) has substantially parallel top and bottom faces, comprising segments (2) flexibly connected by thin hinges of head material (3). The top and bottom faces carry equal numbers of generally parallel transverse grooves (4) filled with elastomer (5). Bristles, extending from the top face are distributed in a plurality of tufts (6). The head has a point of attachment (7) for a handle.

Figure 2:
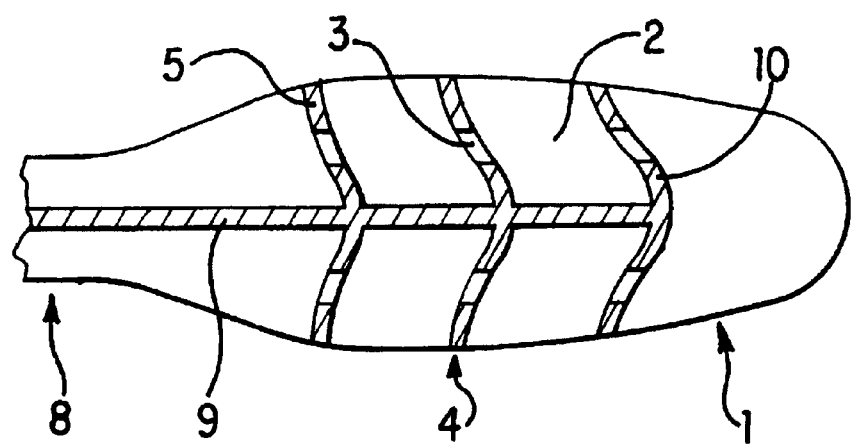
FIG. 2 is a plan view of a brush head showing transverse and longitudinal grooves and discontinuous hinges. The bristles are omitted for the sake of clarity.

Referring to FIG. 2, a toothbrush head (1) is formed integrally at one end of a handle (8). The head includes three pairs of transverse grooves (4), one of each pair being on each of the top and bottom surfaces. The transverse grooves are in the form of waves and a single longitudinal groove (9) connects the transverse grooves and extends into the handle. The grooves are entirely filled with elastomer (5). The transverse grooves define segments of the head (2) which are connected to each other by hinges (3). There are gaps (10) between and to each side of the hinges so that in the gaps, the elastomer extends from top to bottom surfaces.

Figure 3:
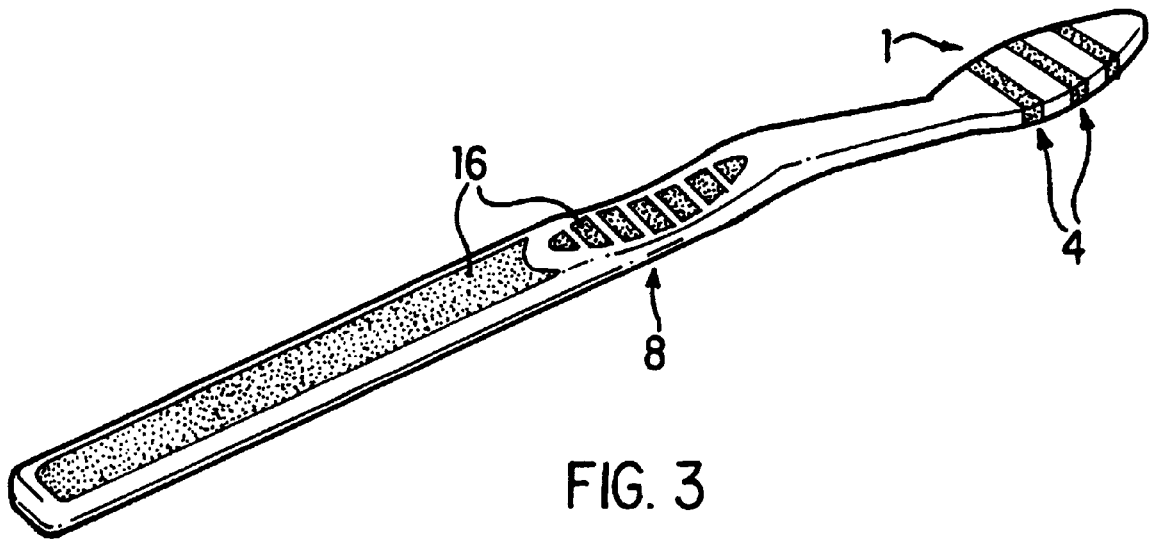
FIG. 3 is a perspective view of a toothbrush according to the invention. The bristles are omitted for the sake of clarity.
Figure 4:
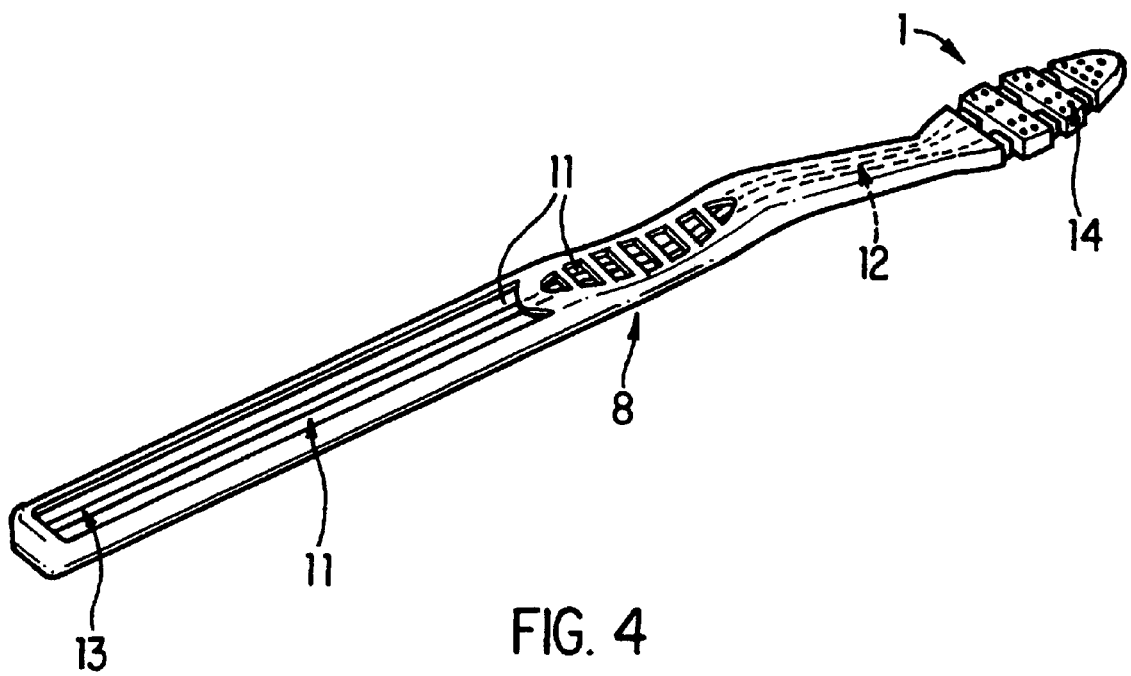
FIG. 4 is a perspective view of the toothbrush shown in FIG. 3 with the elastomer not shown in order to show the hinges and grooves more clearly.

In FIGS. 3 and 4 the head (1) is co-moulded with the handle (8) and is concave along its longitudinal axis on the bristle-bearing (upper) surface. Voids (11) in the handle are filled with elastomer to provide hand grips (16). The voids are connected to each other by a longitudinal groove (12) on the reverse side of the handle which extends into the head and connects the transverse grooves (4) as shown in the view in FIG. 2. The elastomer in the voids and the grooves can be injected from a single injection point (13) and is of a different colour to the head material to give a distinctive appearance. The head has holes (14) disposed on the top surface thereof to accommodate tufts of bristles.

Figure 5:
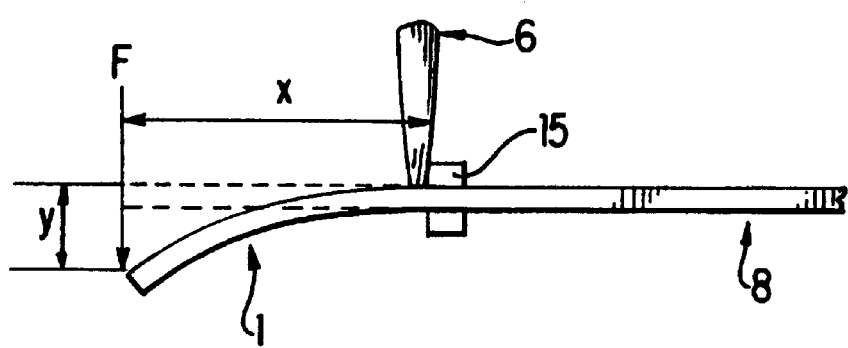
FIG. 5 is a schematic showing the measurement of the flex angle.

FIG. 5 illustrates the measurement of the flex angle. The head (1) is clamped (15) against the first row of bristles (6) at the end which is attached to the handle (8) and a 3 Newton force (F) is applied to the opposite end. The dashed lines show the original position of the brush head before the force is applied. The vertical displacement (y) of the free end of the head under the force F is measured and the flex angle is derived from the distance y and the distance between the clamping point and the application of the force (x) by the relationship tan(flex angle)=y/x.

What is claimed is:

1. A resiliently flexible brush head having a pair of opposing faces, one of the pair being a bristle-bearing face with bristles attached to and extending from the face, the head comprising two or more flexibly connected segments and having grooves on each of the opposing faces between the segments, the grooves on at least one face containing elastomer, wherein the head has a flex angle of less than about 40°.

2. A brush head according to claim 1 wherein the grooves on the bristle-bearing face contain elastomer.

3. A brush head according to claim 1 wherein the grooves on the face opposite to the bristle-bearing face contain elastomer.

4. A brush head according to claim 1 wherein the grooves on each of the opposing faces contain elastomer.

5. A toothbrush comprising an elongated handle and, attached to one end thereof, the brush head according to claim 4.

6. A toothbrush according to claim 5 comprising one or more transverse grooves.

7. A toothbrush according to claim 6 wherein the transverse grooves are arranged in pairs such that one member of each pair is on each face and directly opposes the other member of the pair, with one or more hinges therebetween connecting the segments so that each hinge is located between the two faces and at a distance of at least about 10% of the depth of the head from each of the faces.

8. A toothbrush according to claim 7 wherein each hinge is located at a distance of at least about 30% of the depth of the head from each of the faces.

9. A toothbrush according to claim 8 wherein, when the toothbrush is in its normal stress-free configuration, the free ends of bristles lying along a longitudinal axis of the brush form a generally concave profile.

10. A toothbrush according to claim 9 comprising one or more longitudinal grooves.

* * * * *